(12) United States Patent
Rao et al.

(10) Patent No.: US 11,704,613 B2
(45) Date of Patent: Jul. 18, 2023

(54) SYSTEM AND METHOD FOR IN-VEHICLE DIGITAL PRODUCTIVITY ENHANCEMENT THROUGH PEER-TO-PEER COMMUNICATION

(71) Applicant: Harman International Industries, Incorporated, Stamford, CT (US)

(72) Inventors: Rashmi Rao, West Bloomfield, MI (US); Ramaswamy Iyer, Stamford, CT (US); Reju George, Stamford, CT (US)

(73) Assignee: Harman International Industries, Incorporated, Stamford, CT (US)

(*) Notice: Subject to any disclaimer, the term of this patent is extended or adjusted under 35 U.S.C. 154(b) by 0 days.

(21) Appl. No.: 17/028,378

(22) Filed: Sep. 22, 2020

(65) Prior Publication Data

US 2021/0097465 A1 Apr. 1, 2021

Related U.S. Application Data

(60) Provisional application No. 62/908,393, filed on Sep. 30, 2019.

(51) Int. Cl.
*G06Q 10/06* (2023.01)
*H04W 4/46* (2018.01)
(Continued)

(52) U.S. Cl.
CPC .......... *G06Q 10/06316* (2013.01); *G06Q 30/0281* (2013.01); *H04W 4/44* (2018.02); *H04W 4/46* (2018.02)

(58) Field of Classification Search
CPC .......... G06F 16/951; G06Q 10/0631; G06Q 30/0266; G06Q 10/02; G06Q 30/0265;
(Continued)

(56) References Cited

U.S. PATENT DOCUMENTS

| 9,974,100 | B2 * | 5/2018 | Akama | H04W 4/60 |
| 2018/0033025 | A1 | 2/2018 | Sun et al. | |
| 2019/0222885 | A1 * | 7/2019 | Cho | G06Q 30/0265 |
| 2020/0349666 | A1 * | 11/2020 | Hodge | G08G 1/017 |

FOREIGN PATENT DOCUMENTS

| CA | 3087506 A1 * | 8/2019 | G06F 21/36 |
| CN | 110298637 A * | 10/2019 | |

(Continued)

OTHER PUBLICATIONS

A. Islam, et al. "Introduction of optical camera communication for Internet of vehicles (IoV)," 2017 Ninth International Conference on Ubiquitous and Future Networks (ICUFN), 2017, pp. 122-125, doi: 10.1109/ICUFN.2017.7993760 <https://ieeexplore.ieee.org/document/7993760?source=IQplus > (Year: 2017).*

(Continued)

*Primary Examiner* — Jerry O'Connor
*Assistant Examiner* — Michael R Koester
(74) *Attorney, Agent, or Firm* — Brooks Kushman P.C.

(57) ABSTRACT

In at least one embodiment, an in-vehicle system is provided that includes a transceiver system and a vehicle controller. The transceiver system may be positioned in a first vehicle and is configured to enable communication with one of a surrounding infrastructure to the first vehicle and a surrounding vehicle to the first vehicle. The vehicle controller may be positioned in the first vehicle and is programmed to transmit an electronic request, via the transceiver system, to a Customer Relationship Manager (CRM) server and to receive first information corresponding to the electronic request from the CRM server. The vehicle controller is further programmed to transmit the received first information to one a display in the first vehicle, the surrounding vehicle, and the surrounding infrastructure.

16 Claims, 5 Drawing Sheets

(51) Int. Cl.
*H04W 4/44* (2018.01)
*G06Q 30/02* (2023.01)
*G06Q 10/0631* (2023.01)

(58) Field of Classification Search
CPC ....... H04L 67/12; G07C 5/008; B60R 16/037; H04W 4/02
See application file for complete search history.

(56) References Cited

FOREIGN PATENT DOCUMENTS

KR          20150000015 A  *  6/2013   ............. G06Q 30/02
WO      WO-2018211488 A1 *  11/2018   ........ B60W 60/0011

OTHER PUBLICATIONS

A. Islam, et al. "Introduction of optical camera communication for Internet of vehicles (IoV)," 2017 Ninth International Conference on Ubiquitous and Future Networks (ICUFN), 2017, pp. 122-125, doi: 10.1109/ICUFN.2017.7993760 [online], <https://ieeexplore.ieee.org/document/7993760?source=IQplus > (Year: 2017).*
Office Action for European Application No. 20198167.7, dated Jan. 14, 2022, 7 pages.
Extended European Search Report for Application No. 20198167.7, dated Jan. 29, 2021, 7 pages.
Office Action for European Application No. 20198167.7 filed Sep. 24, 2020, dated May 3, 2023, 5 pgs.

\* cited by examiner

SYSTEM AND METHOD FOR IN-VEHICLE DIGITAL PRODUCTIVITY ENHANCEMENT THROUGH PEER-TO-PEER COMMUNICATION

CROSS-REFERENCE TO RELATED APPLICATIONS

This application claims the benefit of U.S. provisional application Ser. No. 62/908,393 filed Sep. 30, 2019, the disclosure of which is hereby incorporated in its entirety by reference herein.

TECHNICAL FIELD

Aspects disclosed herein generally relate to a system and method for an in-vehicle digital productivity enhancement through peer-to-peer communication. This aspect and others will be discussed in more detail herein.

BACKGROUND

There is an existing gap in terms of bridging a sales enterprise to auto sales insights and productivity on the go. In general, sales insights and productivity involve heavy databases with heavy processing and complex language. Such aspects may not be easy to implement for a satisfactory and productive in-vehicle experience. Further, there is no current option to provide real-time updates or sales insights on the go for occupants in the vehicle.

SUMMARY

In at least one embodiment, an in-vehicle system is provided that includes a transceiver system and a vehicle controller. The transceiver system may be positioned in a first vehicle and is configured to enable communication with one of a surrounding infrastructure to the first vehicle and a surrounding vehicle to the first vehicle. The vehicle controller may be positioned in the first vehicle and is programmed to transmit an electronic request, via the transceiver system, to a Customer Relationship Manager (CRM) server and to receive first information corresponding to the electronic request from the CRM server. The vehicle controller is further programmed to transmit the received first information to one at least one of a display in the first vehicle, the surrounding vehicle, and the surrounding infrastructure.

In at least another embodiment, an in-vehicle system is provided that includes a transceiver system and a vehicle controller. The transceiver system may be positioned in a first vehicle and is configured to enable communication with one of a surrounding infrastructure to the first vehicle and a surrounding vehicle to the first vehicle. The vehicle controller may be positioned in the first vehicle and is programmed to transmit an electronic request, via the transceiver system, to the CRM server and to receive first information corresponding to the electronic request from the CRM server. The vehicle controller is further programmed to transmit the received information to one of the surrounding infrastructure of the first vehicle and to the surrounding vehicle of the first vehicle. The received first information corresponds to a business-related activity for a vehicle occupant of the first vehicle.

In at least another embodiment, a method for performing communication with a CRM server is provided. The method includes communicating, via a transceiver system positioned in a first vehicle, with one of a surrounding infrastructure of the first vehicle and a surrounding vehicle to the first vehicle. The method further includes transmitting an electronic request via the transceiver system to the CRM server and receiving first information corresponding to the electronic request from the CRM server. The method further includes transmitting the received first information to one of the surrounding infrastructure of the first vehicle and to the surrounding vehicle of the first vehicle. The received information corresponds to a business-related activity for a vehicle occupant of the first vehicle.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
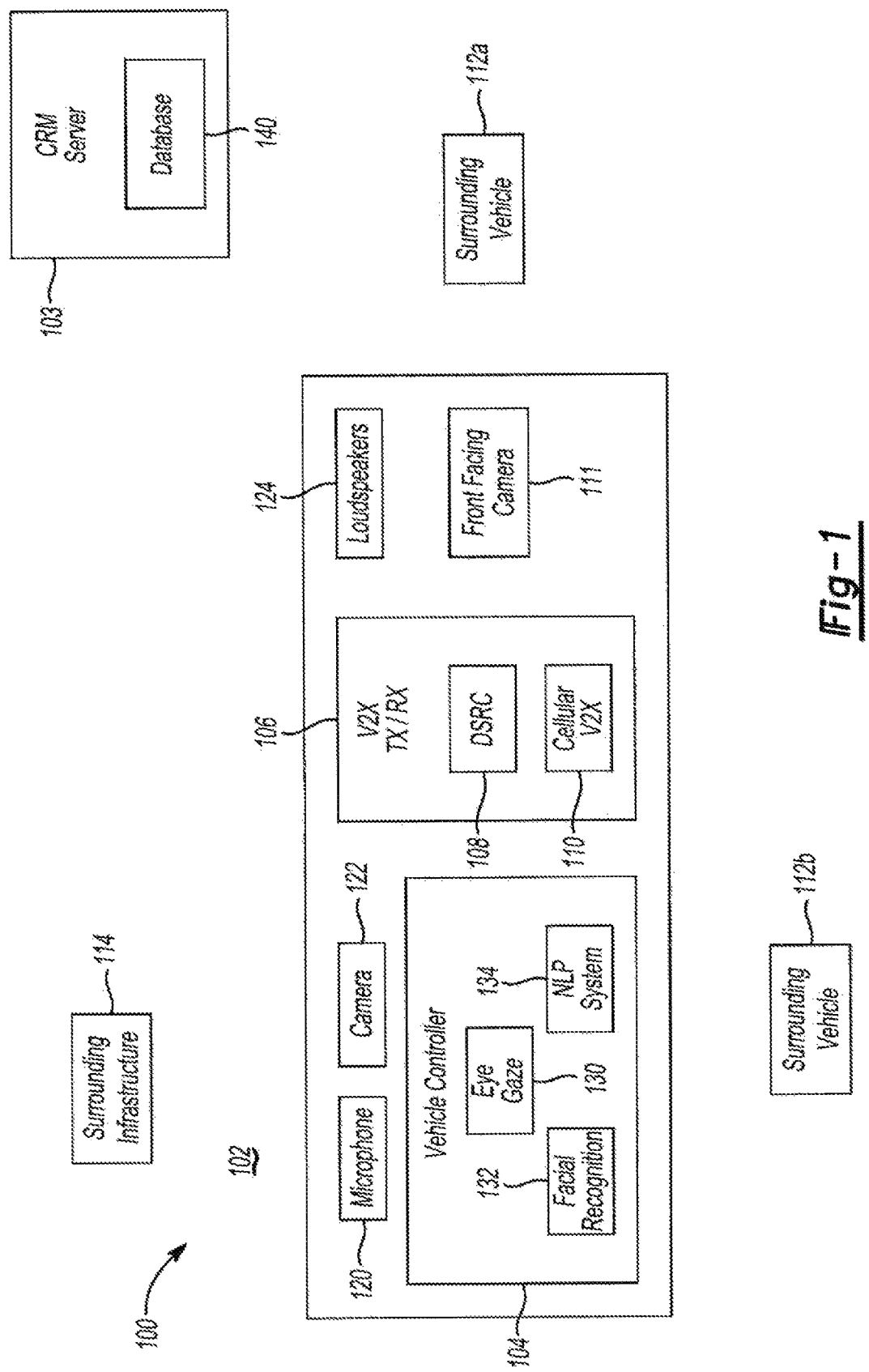
FIG. 1 generally depicts a system for in-vehicle digital productivity enhancement through peer-to-peer communication in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Aspects disclosed herein generally provide for, but not limited to, an integration of on-to-go digital sales and business management productivity features in-vehicle. For example, the vehicle may now provide safe productivity and reduce an office footprint as business owners may conduct and manage business affairs while in their vehicle. This may particularly advantageous for Level-3 and higher autonomous vehicles (AVs). The in-vehicle system as set forth below may facilitate sales between the vehicle occupant (e.g., business operator) and customers outside of the vehicle. For example, the in-vehicle system provides electronic logistics for sale productivity in the vehicle on the move. Additionally, an enhancement of digital sales productivity via a location-based and peer-to-peer communications may be realized. The vehicle occupant may engage in Geo based business insights in addition to V2X (i.e., V2V or V2I) based business insights.

The in-vehicle system may also provide improved user interface capabilities to enable friction-less interactions between user operations/requests/activities and externally positioned customer resource management (CRM) servers. For example, vehicle occupants may request complex reporting, sales, and figures that may be stored externally on the CRM servers via minimized gestures in-vehicle to reduce/mitigate driver distraction. The in-vehicle system may employ natural language processing (NLP) to interpret, accurately, an underlying intent (e.g., comparing trends, applying a filter) and parameters corresponding to those intent (e.g., field name, data values, etc.) and map such intents to appropriate system actions and deliverables provided in-vehicle (e.g., creating new visualizations, updating an existing chart, etc.). The user interface may also yield visualization for the user to interpret an output that would provide, for example, a graphic that could be support by voice. Additional user interfaces may include eye gaze tracking, facial recognition, lip reading (e.g., camera image based), etc. These aspects may assist in improving the accuracy of ambiguous or under specified requests provides by the user (e.g., the requests may be less specific or too complex due to multiple meanings for similar sounding words). Further, the accuracy of continued, contextual conversations may be improved and may be similar to that of face to face verbal interaction between humans. Likewise, eye gaze may be used to infer context for improving and limiting voice control vocabulary (e.g., the in-vehicle system retrieves data from a diverse but specific database).

The in-vehicle system may utilize gaze-enabled macros, motives, and manners. For example, shortcuts to groups of commands or actions that can be initiated with a single utterance can be combined with eye gaze tracking. Commands and/or functions can include actions related to embedded systems domains, offboard or cloud related actions (or a combination of these). The in-vehicle system may also provide an in-car scenario (or sales report) that pulls up pre-determined specific graphical view of sales for in-vehicle consumption that may be aided with voice interaction.

FIG. 1 depicts a system 100 for in-vehicle digital productivity enhancement through peer-to-peer communication in accordance to one embodiment. The system 100 generally provides a mechanism for a vehicle occupant (e.g., driver (or user)) to manage a business through a user interface with a vehicle 102. The system 100 may provide on the go digital sales productivity in-vehicle. In particular, the system 100 may be arranged to interface with an external customer relationship manager (CRM) server 103 including an electronic database 140 for the purpose of managing and coordinating activities related to a business (e.g., small, medium, or large) while the driver is in the vehicle 102. For example, the system 100 may interface with any number of CRM platforms such as, but not limited to, Salesforce™, Pipedrive™, Hubspot™, Monday™, Zoho CRM™, Vcita™, PipelineDeals™, etc. It is recognized that such systems may require significant computational processing and it has been difficult to overcome the levels of computational processing needed to interface with CRM software providers (e.g., a CRM server 103) from the vehicle 102. The embodiments set forth herein in connection with the system 100 lessens the computational overhead that is required to interface with CRM software providers and provide for a simple and seamless interface from the vehicle 102 with CRM software providers.

The vehicle 102 may be arranged as an autonomous vehicle and the system 100 may support any of the AV levels of automation. In one example, the system 100 may be arranged to enable users the ability to interface with the CRM server 103 while minimizing driver distraction in moments in which the driver is required to actively engaged in driving the vehicle 102. The system 100 includes at least one vehicle controller 104 (hereafter "the vehicle controller 104"), a transceiver/receiver system 106, and at least one front facing camera 111 (hereafter "the front facing camera 111). The transceiver/receiver ("TX/RX") system 106 is generally equipped to support V2X (e.g., Vehicle to Vehicle or Vehicle to Infrastructure communication). The Tx/Rx system 106 generally includes Dedicated Short-Range Communications (DRSC) processing circuitry 108 and Cellular V2X processing circuitry 110. The DRSC processing circuitry 108 generally enables the vehicle 102 to communicate with surrounding vehicles 112a, 112b and/or a surrounding infrastructure 114 (or surrounding environment (e.g., road signs, traffic lights, etc.) to the vehicle 102 via over the air messages that may be compliant with IEEE802.11p standard (or other suitable standard). Alternatively, a long-range option of communication between the vehicle 102, the surround vehicles 112a, 112b and the surrounding infrastructure 114a may involve Cellular V2X (or 4G/5G (or other suitable network) V2X). While not shown, it is recognized that the vehicle 102 may also engage in communication via WIFI with servers that are external to the vehicle 102.

The system 102 also includes microphones 120, interior based cameras 122, and loudspeakers 124. The vehicle controller 104 is generally configured to receive inputs from the microphones 120 and the interior based cameras 122. The vehicle controller 104 includes an eye gaze processor 130, a facial recognition processor 132, and a natural language processing (NLP) system 134. The eye gaze processor 130 receives inputs from the interior based camera 122 to ascertain to track and determine areas of focus of the driver's eyes. In one example, the eye gaze processor 130 may ascertain or determine the user's primary source of focus on a particular subset of information that is located on a document that is presented on a display of the vehicle 110. The facial recognition processor 132 receives inputs from the interior based cameras 122 to ascertain particular facial patterns or gestures. In one example, the facial recognition processor 132 may ascertain the identity of the driver (or other vehicle occupant) and use such information to authenticate the occupant's credentials with the CRM server 103 to establish communication between the vehicle 102 and the CRM server 103. Additionally, the facial recognition processor 132 may determine various facial expressions for example such as frowns which may exhibit frustration or a smile or positive nod which exhibit happiness or satisfaction with the item being delivered from the CRM server 103. The facial recognition processor 132 may utilize the facial expressions contextually to determine whether documents presented on the display correspond to documents that may be requested via voice inputs into the microphones 120 from the CRM system. The NLP system 134 may receive inputs from the microphones 120 and determine intent of the received voice inputs to provide requested aspects from the CRM server 103.

Through the utilization of the microphones 120, the in-vehicle cameras 122, the eye gaze processor 130, the facial recognition processor 32, and/or the NLP system 134, the vehicle occupant can access business related documents on the CRM server 103 for presentation on a vehicle display (or alternatively on the occupant's mobile device via BLUETOOTH connection with the vehicle 102). Thus, the vehicle occupant may be able to manage his/her business operations while in the vehicle 100. Again, traditionally, access to the CRM server 103 is computationally expensive with overhead. However, through communication via the V2X based Tx/Rx system 106, the vehicle 102 may obtain and manage critical business documents and operations while on the go in the vehicle 102. Likewise, the vehicle occupant may engage in sales opportunities by marketing sales, products, services etc. to occupants in other vehicles or to customers located outside of the vehicle through V2V and V2I communications, respectively.

The utilization of the microphones 120, the in-vehicle cameras 122, the eye gaze processor 130, the facial recognition processor 132, and/or the NLP system 134, the vehicle occupant can access business related documents on the CRM server 103. For example, the vehicle occupant may request prompt back to the vehicle occupant, via the microphones 120 and the NLP system 134 of the vehicle 102 for the CRM server 103 to provide complex reports, sales, figures, etc. to the vehicle 103 for display or for verbal output. The NLP system 134 may be used to interpret underlying requests may by the vehicle occupant by comparing trends and/or applying a filter. The NLP system 134 may also map parameters corresponding to those intents (e.g., data field name, data values, etc.) to appropriate system actions such as, for example, creating new visualizations, updating an existing chart, etc. This aspect yields visualization for the user to interpret an output that may provide a graphic that could be supported by voice prompt or voice command.

Supplementary components such as the in-vehicle cameras 112, the eye gaze processor 130, and the facial recognition processor 132 may aid in assessing contextual aspects related to a vehicle occupant's request to provide a less-distracted environment for providing the requested information. For example, the accuracy of the requested information to be provided by the CRM server 103 may be increased when faced with ambiguous/under specified queries (e.g., inquiries that are less specific or too complex due to multiple meaning for similar sounding words). The supplementary components may improve accuracy and provide continued, contextual conversations, for example, similar to face to face verbal interactions between humans. For example, the eye gaze processor 130 may be used to ascertain the occupant's eye gaze as a mechanism to further determine what is being requested by the occupant to improve limited voice control vocabulary. In general, with the aid of the supplementary components such as the in-vehicle cameras 112, the eye gaze processor 130, and the facial recognition processor 132, the system 100 may be required to retrieve data from the CRM server 103 from a diverse but yet specific database 140. In one example, the occupant may request for the CRM server 103 to provide a "sales report" with pre-determined specific graphical views for in-vehicle consumption that is not only aided through voice interaction but by, if necessary, the supplementary components.

The front facing camera 111 may also be used to capture data from surrounding vehicles 112a-112b. For example, an occupant in one or more of the surrounding vehicle 112a may be interested in particular service, perhaps for example an interest in purchasing in a home in the area in which the surrounding vehicle 112a is being driven. The occupant in the surrounding vehicle 112a while traveling in the area of interest may generate an encrypted code that is displayed on a rear license plate of the surrounding vehicle 112a. In this case, the license plate may not be a metal-based license plate with identification characters as is generally known. Rather, a display may be positioned in a rear of the vehicle that displays identification characters. The display may further include a designated spot for providing codes that correspond to areas of interest for the occupant of the vehicle 112a. Such a display may be characterized as a digital license plate. Thus, assuming the occupant is interested in obtaining more information about the housing market in the area, the occupant in the surrounding vehicle 112a may control the surrounding vehicle 112a to generate and display the code (e.g., QR code or other code) on a section of the digital license plate that corresponds to a solicitation or request to provide, for example, but not limited to home market analysis for the area of interest.

The front facing camera 111 may capture the code that is displayed on the surrounding vehicle 112a. The front facing camera 111 may then send information corresponding to the code to the vehicle controller 104. The vehicle controller 104 may then decrypt the code and generate a prompt on a display on the vehicle or directly to the vehicle occupant's mobile device. The prompt will indicate the vehicle occupant's request from the surrounding vehicle 112a to provide a home market analysis for the area of interest. The occupant in the vehicle 102 may then provide the requested information to the occupant in the surrounding vehicle 112a. For example, the occupant in the vehicle 102 may obtain such information from the CRM server 103 and transmit the same back to the surrounding vehicle 112a via V2V interface. It is also recognized, that the occupant in the surrounding vehicle 112a may also generate the foregoing code and wirelessly transmit the code to other vehicles that are on the road via V2V or to services (e.g., brick and mortar buildings—real estate offices in the area of interest) that are connected to the surrounding vehicle 112a via a V2I interface. With the vehicle to vehicle example noted above, the vehicle 102 may wirelessly receive the code from the surrounding vehicle 112a and present a prompt corresponding to the requested information on a display thereof (or alternatively on the occupant's mobile device). The occupant of the vehicle 102 may obtain information to respond to the request via the V2X Tx/Rx system 106 from the remote server 103 and transmit the requested information back to the surrounding vehicle 112a via the V2X Tx/Rx system 106.

FIG. 2A-2E generally depict various attributes that may be performed by the in-vehicle system in accordance to one embodiment.

Figure 2A:
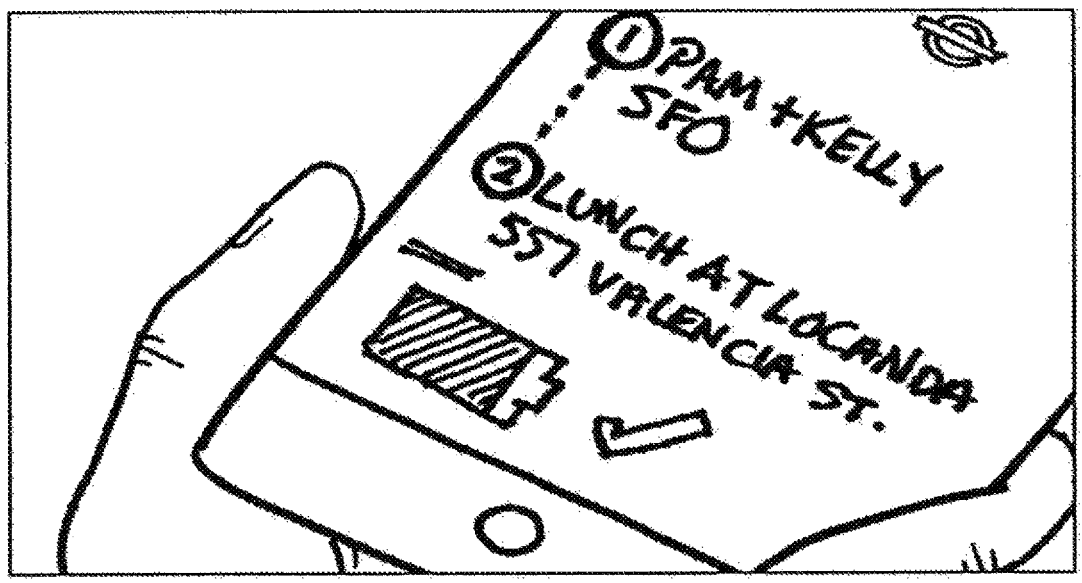
FIG. 2A-2E generally depict various attributes that may be performed by the in-vehicle system in accordance to one embodiment.

FIG. 2A depicts a mobile device belonging to a vehicle occupant that illustrates a personalization aspect in which the vehicle occupant's calendar is shown. Alternatively, it is recognized that this may be displayed on a display in the vehicle 102. This information may be stored on the CRM server 103 and alternatively be retrieved by the in-vehicle system 100 and illustrated on a mobile device and/or on a display positioned on the vehicle 102. In addition, this information may be input into the mobile device or into the display on the vehicle 100 for transmission to the CRM server 103. In this case, the occupant in the vehicle 100 may be authenticated to the CRM server 103 via facial recognition. Various technology enablers for this aspect may involve, facial recognition, cloud services, IOT, and/or a mobile device application. The aspect illustrated in FIG. 2A may, for example, correspond to adding a 'Work' (or Saleforce™) profile at registration.

Figure 2B:
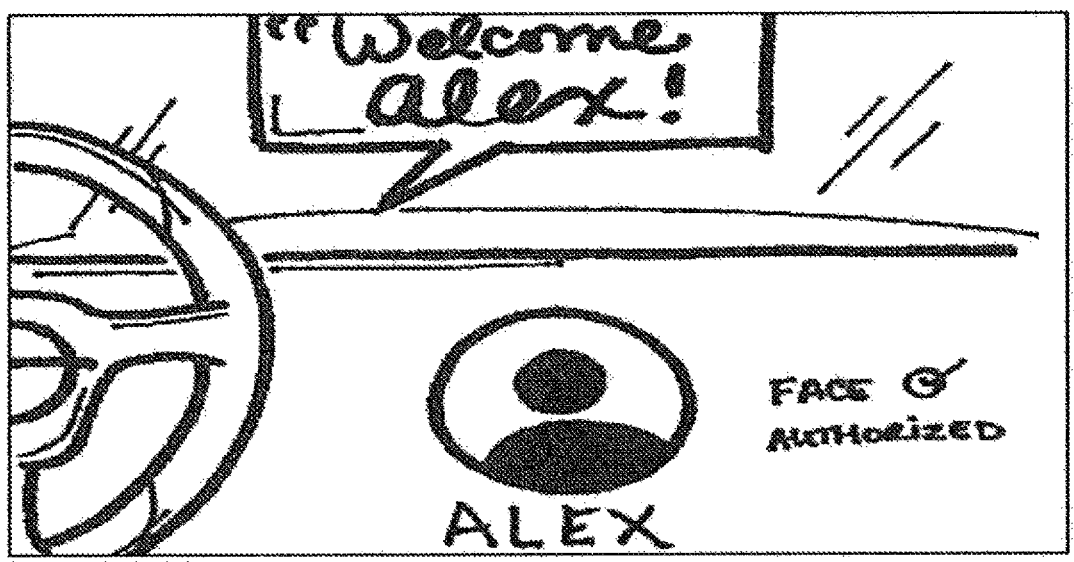

FIG. 2B generally corresponds to the in-vehicle system 100 properly authenticating a user. Here, it can be seen that the vehicle 102 provides a welcome greeting to the authorized user and an indication is provided on the display itself of the recognition and authorization of a properly identified face of the authorized user via facial recognition. The various technology enabler for this aspect may involve facial recognition, a productivity application implementation on the display of the vehicle 102, cloud services, IOT and facial recognition. In one example, the vehicle controller 104 is to perform facial recognition, via the facial recognition controller 132 on a vehicle occupant in the vehicle 102 and to enable the vehicle occupant to receive the business related information from the CRM server 103 at the vehicle 102 based on a facial recognition of the vehicle occupant matching a predetermined facial image of the vehicle occupant (or a previously stored image of the vehicle occupant that has been authenticated to the CRM server 103.

Figure 2C:
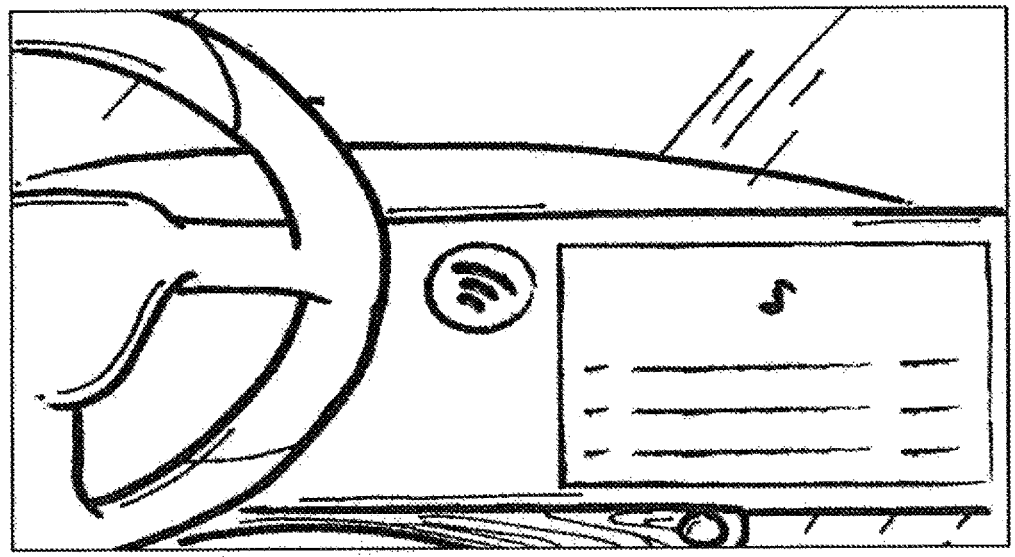

FIG. 2C generally corresponds to the in-vehicle system 100 displaying, for example, a sales report. The system 100 enables the vehicle occupant to request and to extract specific view of a requested report, assuming the vehicle occupant has pre-defined the various template views. The in-vehicle system 100 may also enable the vehicle occupant to email (or share) the report to himself/herself (e.g., to another device) or to other colleagues. The various technology enablers for this aspect may involve a productivity application implementation on the display of the vehicle 102, cloud services, and/or IOT.

Figure 2D:
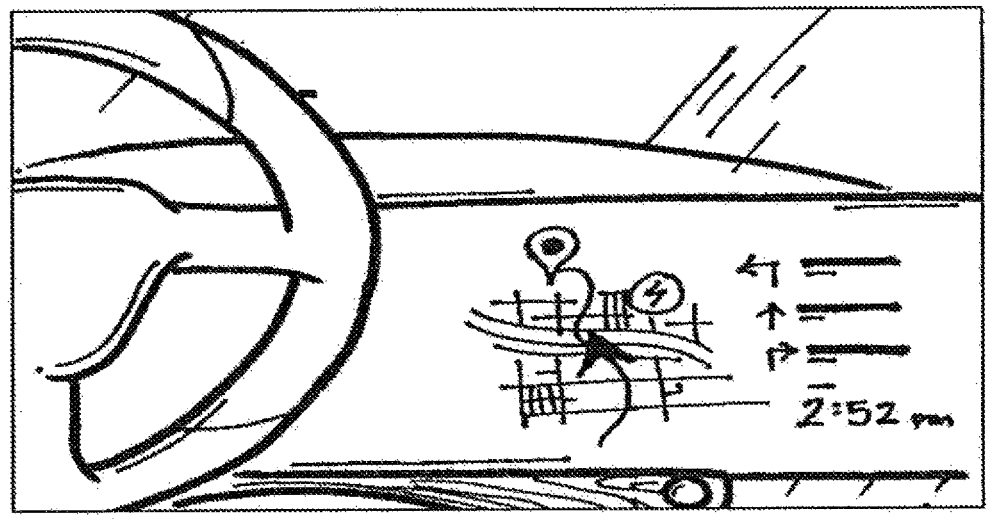

FIG. 2D generally corresponds to the vehicle occupant providing a notification to alter a service that was to be provided in a specific location (e.g., home or business establishment). For example, using the V2X Tx/Rx system 106, the occupant may transfer a request of the altered service to a corresponding co-worker that is in close proximity to the specific location. The various technology enablers for this aspect may involve a productivity application implementation on the display of the vehicle 102, cloud services, IOT and/or V2X.

Figure 2E:
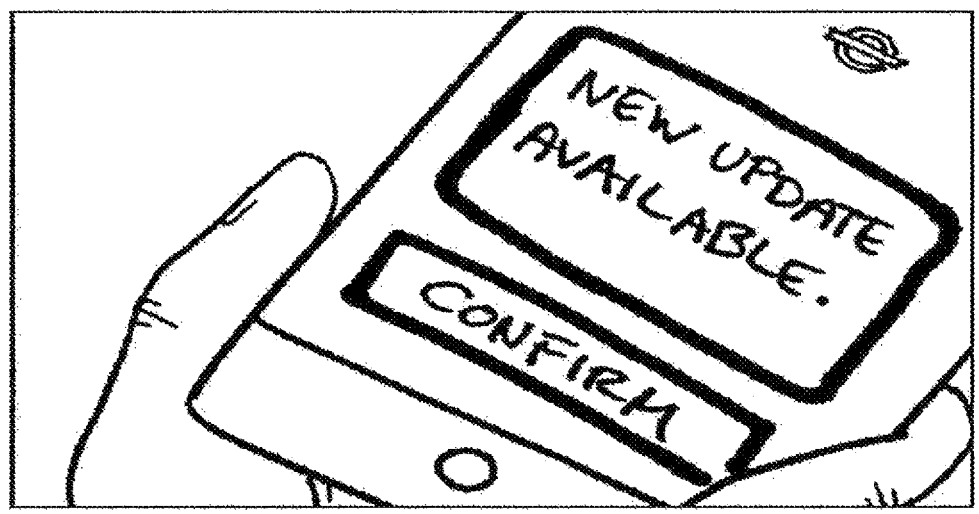

FIG. 2E generally corresponds to the vehicle occupant reaching a destination and that there is a notification on the display (or screen) of the vehicle 102 or on the mobile device belonging to the occupant that a new possible sales pursuit (or update) is available. The various technology enablers for this aspect may involve a mobile app on the mobile device, a productivity application implementation on the display of the vehicle 102, cloud services, and/or IOT.

Figure 3:
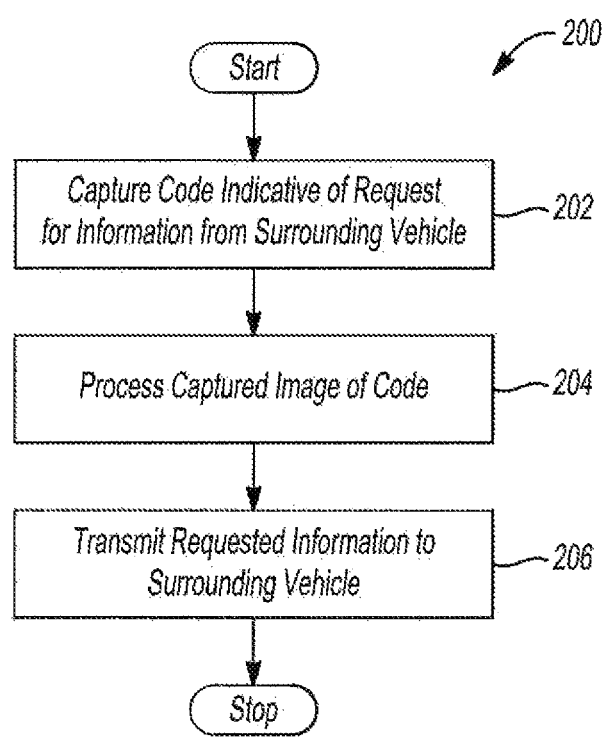
FIG. 3 depicts a method for receiving a code from a surrounding vehicle and transmitting requested information corresponding to the surrounding vehicle in accordance to one embodiment.

FIG. 3 depicts a method 200 for receiving a code from a surrounding vehicle and transmitting requested information corresponding to the surrounding vehicle in accordance to one embodiment.

In operation 202, the front facing camera 108 on the vehicle 102 captures an image of a code that is presented on the surrounding vehicle 112a. As noted above, the surrounding vehicle 112a may present or display the code on, for example, an electronic license plate display (or elsewhere on the vehicle 112a). The code may correspond to a request for information, such as for example, a request to respond to an inquiry for a service or a good that is of interest to a vehicle occupant in the surrounding vehicle 112a.

In operation 204, the vehicle 102 processes the captured image of the code. For example, the front facing camera 111 transmits information corresponding to the capture image of the code to the vehicle controller 104. The vehicle controller 104 decrypts the information corresponding to the code to determine what type of information is being requested. In one example, the vehicle controller 104 may undergo any number of machine learning operations to learn any number of codes that may be captured to decrypt the captured image of the code. In yet another example, the code may correspond to a QR code or other suitable code. In this case, the vehicle controller 104 may not have to utilize machine learning to ascertain the contents of the QR code. The vehicle controller 104 may simply decrypt the QR code using standard code reader techniques. The vehicle controller 104 determines a response to the requested information as provided by the code. For example, assuming the code corresponds to a request for a business service or good for sale, the vehicle controller 104 may transmit a message to the CRM server 103 to obtain information for the service or good for sale. The CRM server 103 may provide the information to the vehicle 102 via the V2X Tx/Rx system 106.

In operation 206, the vehicle 102 transmits the requested information back to the surrounding vehicle 112a via the V2X Tx/Rx system 106. The surrounding vehicle 112a may provide the requested information on a display thereof or may wirelessly transmit the information to a mobile device for the vehicle occupant of the surrounding vehicle 112a that made the original request for information.

It is recognized that the controllers as disclosed herein may include various microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An in-vehicle system comprising:
a transceiver system for being positioned in a first vehicle, the transceiver system being configured to enable communication with one of a surrounding infrastructure and a surrounding vehicle to the first vehicle;
a vehicle controller for being positioned in the first vehicle, the vehicle controller being programmed to:
transmit an electronic request, via the transceiver system, to a Customer Relationship Manager (CRM) server;
receive first information corresponding to the electronic request from the CRM server; and
transmit the received first information to one of a display in the first vehicle, the surrounding vehicle, and the surrounding infrastructure; and
a camera positioned on the first vehicle and being programmed to capture an image of a code on the surrounding vehicle, the code being indicative of a request of second information for a desired service or good for a vehicle occupant in the surrounding vehicle,
wherein the vehicle controller is further programmed to process the captured image of the code to determine the desired service or good that is being requested by the vehicle occupant in the surrounding vehicle, and wherein the vehicle controller is further programmed to perform facial recognition on a vehicle occupant in the first vehicle to provide a first facial image of the vehicle occupant and to transmit the electronic request to the CRM server after matching the first facial image of the vehicle occupant in the first vehicle to a predetermined facial image of the vehicle occupant.

2. The system of claim 1, wherein the first information corresponds to a one of a sales report, sales lead, sales contact.

3. The system of claim 1, wherein the transceiver system is one of a vehicle to everything (V2X) transceiver system, a WIFI system, or a cellular based system.

4. The system of claim 1, wherein the vehicle controller is further programmed to transmit a message, via the transceiver system, to the CRM server to request the second information from the CRM server.

5. The system of claim 4, wherein the vehicle controller is further programmed to transmit the second information, via the transceiver system, to the surrounding vehicle such that the surrounding vehicle provides the second information on a display positioned thereon or to a mobile device belonging to the vehicle occupant in the surrounding vehicle.

6. The system of claim 1, wherein the vehicle controller is further programmed to perform the facial recognition on the vehicle occupant in the first vehicle to assess a facial expression of the vehicle occupant in the first vehicle while viewing requested information on a display and to obtain additional information in response to the facial expression indicating that the requested information does not correspond to a desired set of information.

7. An in-vehicle communication system comprising:
a transceiver system for being positioned in a first vehicle, the transceiver system being configured to enable communication with one of a surrounding infrastructure and a surrounding vehicle to the first vehicle;
a vehicle controller for being positioned in the first vehicle, the vehicle controller being programmed to:
transmit an electronic request, via the transceiver system, to a Customer Relationship Manager (CRM) server;
receive first information corresponding to the electronic request; and
transmit the received first information to one of the surrounding infrastructure to the first vehicle and to the surrounding vehicle of the first vehicle,
wherein the received first information corresponds to a business-related activity for a vehicle occupant of the first vehicle; and
a camera positioned on the first vehicle and being programmed to capture an image of a code on the surrounding vehicle, the code being indicative of a request of second information for a desired service or good for a vehicle occupant in the surrounding vehicle,
wherein the vehicle controller is further programmed to process the captured image of the code to determine the desired service or good that is being requested by the vehicle occupant in the surrounding vehicle, and
wherein the vehicle controller is further programmed to perform facial recognition on a vehicle occupant in the first vehicle to provide a first facial image of the vehicle occupant and to transmit the electronic request to the CRM server to obtain information for the business-related activity after matching the first facial image of the vehicle occupant to a predetermined facial image of the vehicle occupant.

8. The system of claim 7, wherein the business-related activity corresponds to a one of a sales report, sales lead, sales contact.

9. The system of claim 7, wherein the transceiver system is one of a vehicle to everything (V2X) transceiver system, a WIFI system, or a cellular based system.

10. The system of claim 7, wherein the vehicle controller is further programmed to transmit a message, via the transceiver system, to the CRM server to request the second information from the CRM server.

11. The system of claim 10, wherein the vehicle controller is further programmed to transmit the second information, via the transceiver system, to the surrounding vehicle such that the surrounding vehicle provides the second information on a display positioned thereon or to a mobile device belonging to the vehicle occupant in the surrounding vehicle.

12. The system of claim 7, wherein the vehicle controller is further programmed to perform the facial recognition on the vehicle occupant in the first vehicle to assess a facial expression of the vehicle occupant in the first vehicle while viewing the first information corresponding to the business-related activity on a display and to obtain additional information from the CRM server in response to the facial expression indicating that the first information does not correspond to a desired set of information.

13. An in-vehicle method for electronically communicating with a Customer Relationship Manager (CRM) server, the method comprising:
communicating, via a transceiver system positioned in a first vehicle, with one of a surrounding infrastructure of the first vehicle and a surrounding vehicle to the first vehicle; and
transmitting an electronic request via the transceiver system to the CRM server;
receiving first information corresponding to the electronic request from the CRM server;
transmitting the received first information to one of the surrounding infrastructure of the first vehicle and to the surrounding vehicle of the first vehicle,
wherein the received first information corresponds to a business-related activity for a vehicle occupant of the first vehicle;
capturing an image of a code on the surrounding vehicle, the code being indicative of a request of second information for a desired service or good for a vehicle occupant in the surrounding vehicle;
processing the captured image of the code to determine the desired service or good that is being requested by the vehicle occupant in the surrounding vehicle;
performing facial recognition on a vehicle occupant in the first vehicle to provide a first facial image of the vehicle occupant; and
transmitting the electronic request to the CRM server to obtain information for the business-related activity after matching a first facial image of the vehicle occupant to a predetermined facial image of the vehicle occupant.

14. The method of claim 13, further comprising transmitting a message, via the transceiver system, to the CRM server to request the second information from the CRM server.

15. The method of claim 14, further comprising transmitting the second information, via the transceiver system, to the surrounding vehicle such that the surrounding vehicle provides the second information on a display positioned thereon or to a mobile device belonging to the vehicle occupant in the surrounding vehicle.

16. The method of claim 13 further comprising performing the facial recognition on the vehicle occupant in the first vehicle to assess a facial expression of the vehicle occupant in the first vehicle while viewing the first information corresponding to the business-related activity on a display and obtaining additional information from the CRM server in response to the facial expression indicating that the first information does not correspond to a desired set of information.

\* \* \* \* \*